United States Patent
Kagawa et al.

(10) Patent No.: US 12,194,766 B2
(45) Date of Patent: Jan. 14, 2025

(54) PRETREATMENT LIQUID

(71) Applicant: Nippon Kayaku Kabushiki Kaisha, Tokyo (JP)

(72) Inventors: Tsukasa Kagawa, Tokyo (JP); Yoshimasa Miyazawa, Tokyo (JP); Ha Sai, Tokyo (JP)

(73) Assignee: Nippon Kayaku Kabushiki Kaisha, Tokyo (JP)

( * ) Notice: Subject to any disclaimer, the term of this patent is extended or adjusted under 35 U.S.C. 154(b) by 412 days.

(21) Appl. No.: 17/258,574

(22) PCT Filed: Jul. 22, 2019

(86) PCT No.: PCT/JP2019/028615
§ 371 (c)(1),
(2) Date: Jan. 7, 2021

(87) PCT Pub. No.: WO2020/026870
PCT Pub. Date: Feb. 6, 2020

(65) Prior Publication Data
US 2021/0268819 A1    Sep. 2, 2021

(30) Foreign Application Priority Data

Aug. 2, 2018  (JP) ................................ 2018-146137

(51) Int. Cl.
*B41M 5/00*  (2006.01)
*B41J 2/01*  (2006.01)
*B41J 2/21*  (2006.01)
*C09D 11/32*  (2014.01)

(52) U.S. Cl.
CPC .............. *B41M 5/0017* (2013.01); *B41J 2/01* (2013.01); *B41M 5/0047* (2013.01); *C09D 11/32* (2013.01); *B41J 2/2107* (2013.01)

(58) Field of Classification Search
CPC ........ B41M 5/0076; B41M 3/14; B41M 5/00; B41M 5/0047; B41M 2205/40; B41M 5/0011; B41M 5/0017; B41M 5/0023; B41M 7/00; B41M 7/0072; B41M 5/52; B41M 5/5218; B41M 5/5227; C08G 18/73; C09D 11/101; C09D 11/322; C09D 175/04; C09D 11/326; C09D 11/107; C09D 11/03; C09D 11/037; C09D 11/033; C09D 11/36; C09D 11/40; C09D 11/30; C09D 11/38; C09D 11/32; C09D 11/324; C09D 11/328; C09D 11/102; C09D 11/005; C09D 11/54; C09D 11/52; C09D 11/106; C14C 1/00; D06P 1/44; D06P 5/2005; D06P 1/5285; D06P 3/32; D06P 5/30; C14B 1/56; B41J 25/001; B41J 25/34; B41J 25/003; B41J 2/21; B41J 25/312; B41J 2025/008; B41J 2202/21; B41J 2/17596; B41J 2/16508; B41J 2/1652; B41J 2/16538; B41J 2/175; B41J 2/17563; B41J 29/02; B41J 2/17513; B41J 2/17509; B41J 29/13; B41J 2/17553; B41J 2/1606; B41J 2/1642; B41J 2/1609; B41J 2/1433; B41J 2/164; B41J 2/162; B41J 2/161; B41J 2/19; B41J 15/04; B41J 2/1623; B41J 2202/00; B41J 2202/03; B41J 2/14201; B41J 2/045; B41J 11/0015; B41J 11/002; B41J 2/04581; B41J 2/055; B41J 2002/16502; B41J 2/04588; B41J 2/04595; B41J 2/04586; B41J 2/14274; B41J 2/01; B41J 2/211; B41J 2/17; B41J 2/17593; B41J 2/2107; B41J 2/1755; B41J 2/2114; B41J 2/2117; B41J 2/2056; B41J 2/0057; B41J 3/60; B41J 2002/012; B41J 2/04598
See application file for complete search history.

(56) References Cited

U.S. PATENT DOCUMENTS

| | | | | |
|---|---|---|---|---|
| 5,017,268 A | * | 5/1991 | Clitherow | D21H 17/00 162/146 |
| 2007/0003716 A1 | * | 1/2007 | Suzuki | B41M 5/502 106/491 |
| 2008/0152825 A1 | | 6/2008 | Mukai et al. | |
| 2010/0056421 A1 | * | 3/2010 | Corona, III | C11D 3/227 510/276 |
| 2011/0043578 A1 | * | 2/2011 | Tojo | B41M 5/0023 347/102 |
| 2012/0077725 A1 | * | 3/2012 | Wang | C11D 3/227 510/528 |
| 2012/0140009 A1 | * | 6/2012 | Kanasugi | B41J 2/0057 347/103 |
| 2013/0088543 A1 | | 4/2013 | Tsuji et al. | |
| 2013/0253106 A1 | * | 9/2013 | Saito | C09D 11/322 524/104 |
| 2015/0044431 A1 | | 2/2015 | Landa et al. | |

(Continued)

FOREIGN PATENT DOCUMENTS

| | | |
|---|---|---|
| JP | H 10-329416 A | 12/1998 |
| JP | 2000-238422 A | 9/2000 |

(Continued)

*Primary Examiner* — Manish S Shah
(74) *Attorney, Agent, or Firm* — Knobbe, Martens, Olson & Bear, LLP

(57) ABSTRACT

A pretreatment liquid containing a multivalent metal salt, a cationized guar gum, and water, and an image forming method using the pretreatment liquid. The pretreatment liquid is applied to recording media before an aqueous color ink containing colorant is applied to the recording media.

3 Claims, No Drawings

(56) References Cited

U.S. PATENT DOCUMENTS

| | | | | |
|---|---|---|---|---|
| 2015/0091974 A1* | 4/2015 | Aoyama | ................ | C09D 11/40 |
| | | | | 347/21 |
| 2015/0274992 A1* | 10/2015 | Aoyama | ................ | C09D 11/38 |
| | | | | 347/21 |
| 2019/0100871 A1* | 4/2019 | Taga | .................... | C09D 11/322 |
| 2021/0079245 A1* | 3/2021 | Li | ........................ | C09D 11/322 |

FOREIGN PATENT DOCUMENTS

| | | | | |
|---|---|---|---|---|
| JP | 2000-335084 A | | 12/2000 | |
| JP | 2002-019263 A | | 1/2002 | |
| JP | 2004-330695 A | | 11/2004 | |
| JP | 2006124855 A | * | 5/2006 | ............... B41J 2/01 |
| JP | 2006-281570 A | | 10/2006 | |
| JP | 3904120 B2 | | 4/2007 | |
| JP | 2007-239152 A | | 9/2007 | |
| JP | 2009-241304 A | | 10/2009 | |
| JP | 2012-116172 A | | 6/2012 | |
| JP | 2012-131108 A | | 7/2012 | |
| JP | 2013-091313 A | | 5/2013 | |
| JP | 2013-192557 A | | 9/2013 | |
| JP | 2015-517928 A | | 6/2015 | |
| JP | 5834110 B1 | | 12/2015 | |

* cited by examiner

PRETREATMENT LIQUID

This application is the U.S. National Phase under 35 U.S.C. § 371 of International Application PCT/JP2019/028615, filed Jul. 22, 2019, designating the U.S., and published in Japanese as WO 2020/026870 on Feb. 6, 2020, which claims priority to Japanese Patent Application No. 2018-146137, filed Aug. 2, 2018, the entire content of which is incorporated herein by reference.

TECHNICAL FIELD

The present invention relates to a pretreatment liquid and an image forming method using the same.

BACKGROUND ART

Inkjet printing has advantages of high maintainability, less noise during printing, and applicability in plate-free variable printing, compared with conventional plate printing such as offset printing and gravure printing. For this reason, it has been used in a wide range of applications such as office use and home use. In recent years, it has been gradually applied to industrial applications, but many technical problems remain. One of the technical problems is development of a technique that enables inkjet printing for various recording media.

In plate printing, inks which can be printed on various recording media are known: examples of the recording media include highly permeable media such as high-quality paper and recycled paper; less permeable media such as coated paper and art paper; and media having no permeability such as plastic film. On the other hand, in inkjet printing, few inks which can be printed on various recording media are known. By using a UV curable ink, printing becomes possible for various recording media, but in recent years, there has been a strong demand for an aqueous ink from the viewpoint of safety to surrounding environments, such as natural environments and working environments, and living creatures. For this reason, there is a strong demand for development of a technique enabling inkjet printing for various recording media, particularly a technique enabling use of an aqueous ink.

In order to enable inkjet printing using an aqueous ink for various recording media, a technique of performing a pretreatment on a recording medium has been conventionally proposed. In general, as a pretreatment method for an aqueous ink, two types of methods are known: a method of forming a layer (ink receiving layer) which absorbs a liquid component in the ink and improves drying property (see, for example, Patent Documents 1 to 4) and; a method of forming a layer (aggregation layer) which prevents bleeding between liquid droplets and improves image quality by intentionally aggregating solid components contained in the ink, such as a coloring matter or a resin (see, for example, Patent Documents 5 to 7).

In the former method, since the solid component in the ink cannot be immobilized on the recording medium, it is said that the color bleeding cannot be completely controlled. In the latter method, a pretreatment liquid is used in which components which tend to cause aggregation, such as polyvalent metal ions and cationic polymers, are dispersed or dissolved in water. However, there is no known pretreatment liquid which has a viscosity sufficient to be uniformly applied to various recording media, has excellent stability during storage, and enables good image quality to be obtained.

Patent Document 1: Japanese Unexamined Patent Application, Publication No. 2000-238422
Patent Document 2: Japanese Unexamined Patent Application, Publication No. 2000-335084
Patent Document 3: Japanese Unexamined Patent Application, Publication No. 2012-131108
Patent Document 4: Japanese Unexamined Patent Application, Publication No. 2009-241304
Patent Document 5: Japanese Unexamined Patent Application, Publication No. 2002-019263
Patent Document 6: Japanese Patent No. 3904120
Patent Document 7: Japanese Patent No. 5834110

DISCLOSURE OF THE INVENTION

Problems to be Solved by the Invention

An object of the present invention is to provide a pretreatment liquid which can be uniformly applied to various recording media, particularly a recording medium having low permeability, excellent stability during storage, and which allows for a high-quality image to be obtained which does not cause bleeding when an aqueous color ink is applied to the recording medium after application of the pretreatment liquid; and to provide an image forming method using the pretreatment liquid.

Means for Solving the Problems

As a result of diligent research to solve the problems, the present inventors have found that a pretreatment liquid containing a multivalent metal salt, a cationized guar gum, and water can solve the above problems, thereby completing the present invention. That is, the present invention relates to the following first to fourth aspects.

A first aspect of the present invention relates to a pretreatment liquid, including a multivalent metal salt, a cationized guar gum, and water, in which the pretreatment liquid is applied to a recording medium before an aqueous color ink comprising a colorant is applied to the recording medium.

A second aspect of the present invention relates to the pretreatment liquid as described in the first aspect, in which the multivalent metal salt is a salt of a multivalent metal selected from the group consisting of calcium, magnesium, barium, and strontium.

A third aspect of the present invention relates to the pretreatment liquid as described in the first or second aspect, in which the pretreatment liquid further contains a glycol ether.

A fourth aspect of the present invention relates to an image forming method, including applying the pretreatment liquid as described in any one of the first to third aspects to the recording medium, and applying an aqueous color ink containing a colorant to a portion of the recording medium, with the portion being provided with the pretreatment liquid.

Effects of the Invention

According to the present invention, it is possible to provide a pretreatment liquid which can be uniformly applied to various recording media, particularly a recording medium having low permeability, excellent stability during storage, and which allows a high quality image to be obtained which does not cause bleeding when an aqueous color ink is applied to the recording medium after application of the pretreatment liquid; and to provide an image forming method using the pretreatment liquid.

PREFERRED MODE FOR CARRYING OUT THE INVENTION

In the present specification, both "%" and "part(s)" are described on a mass basis, unless otherwise specified.

<Pretreatment Liquid>

The pretreatment liquid according to the present embodiment is a pretreatment liquid which is applied to a recording medium before an aqueous color ink containing a colorant is applied to the recording medium, and contains a multivalent metal salt, a cationized guar gum, and water. The pretreatment liquid according to the present embodiment does not substantially contain a colorant. Herein, "substantially" means that no colorant is intentionally added to the pretreatment liquid. Below, components contained in the pretreatment liquid according to the present embodiment are described.

[Multivalent Metal Salts]

The multivalent metal salts comprise a polyvalent metal ion having two or more valences and an anion. The multivalent metal salts are not particularly limited, and examples thereof include a divalent to hexavalent metal salt, preferably a divalent to tetravalent metal salt, more preferably a divalent to trivalent metal salt, and most preferably a divalent metal salt. Of these metal salts, from the viewpoint of achieving both image quality and stability during storage, a salt of Group 2 elements from the Periodic Table of Elements are preferred, and a salt of a polyvalent metal selected from the group consisting of calcium, magnesium, barium, and strontium is more preferred. Examples of anions include $SO_4^{2-}$, $Cl^-$, $NO_3^-$, $I^-$, $Br^-$, $ClO_3^-$, $CH_3COO^-$, and the like.

The content of the multivalent metal salt is typically about 4 to 20%, preferably 8 to 16%, and more preferably 10 to 14%, with respect to the total mass of the pretreatment liquid. By setting the content of the multivalent metal salt to such a range, image deterioration such as bleeding does not occur when an aqueous color ink is applied to the recording medium after the pretreatment and scratch resistance of the formed image tends to be good. Incidentally, when the multivalent metal salt has water of crystallization or is a hydrate, the content is calculated in terms of anhydride.

[Cationized Guar Gums]

By containing a cationized guar gum, the pretreatment liquid according to the present embodiment has good handling property, stability during storage (particularly stability during storage at high temperature), and applicability to a recording medium. Further, by using this pretreatment liquid, water resistance and scratch resistance of a printed matter obtained by applying an aqueous color ink can be improved, and a high-quality printed matter can be obtained.

The content of the cationized guar gum also varies depending on the molecular weight and the like, and it is difficult to unconditionally determine the content. As a measure, the content is typically about 0.01 to 5%, preferably about 0.01 to 3%, more preferably about 0.05 to 1%, and most preferably about 0.08 to 0.12%, with respect to the total mass of the pretreatment liquid.

The content of the cationized guar gum can also be determined depending on the method of applying the pretreatment liquid. As an example, when the pretreatment liquid is applied by a coater or the like, the content of the cationized guar gum may be such that the viscosity at 20° C. can be typically 10 to 300 mPa·s, preferably 10 to 250 mPa·s, more preferably 10 to 200 mPa·s, more preferably 10 to 35 mPa·s, and most preferably 10 to 33 mPa·s.

[Water]

As water contained in the pretreatment liquid according to the present embodiment, water having less impurities such as metal ions is preferred. Examples of such water include ion-exchanged water and distilled water.

The water content is typically from 10 to 90%, preferably from 20 to 80%, more preferably from 30 to 70%, and most preferably from 40 to 60%, with respect to the total mass of the pretreatment liquid.

[Additives]

In addition to the components described above, the pretreatment liquid according to the present embodiment may appropriately contain an additive such as a thickening agent, a pH adjusting agent, a surfactant, an organic solvent, a humectant, a defoaming agent, or a preservative, if necessary. When the pretreatment liquid contains these additives, the content of the total thereof is typically about 0 to 50%, preferably 10 to 45%, more preferably 20 to 40%, and most preferably about 25 to 35%, with respect to the total mass of the pretreatment liquid.

Of these additives, the defoaming agent and the preservative may be the same defoaming agent and the same preservative, respectively, as those described in ink preparation agents for aqueous color inks, which are described below.

(Thickening Agents)

Examples of thickening agents include polyethyleneimine; polyamides; water-soluble resins containing a quaternary ammonium base; polyacrylamide; polyvinylpyrrolidone; polyalkylene oxide; starch; water-soluble cellulose such as methylcellulose, hydroxycellulose, carboxymethylcellulose, hydroxymethylcellulose, hydroxypropylcellulose, and hydroxypropylmethylcellulose; polyvinyl methyl ether; polyvinyl acetal; polyvinyl alcohol; modified products thereof; and the like. From the viewpoint of compatibility with multivalent metal salts, a cationized thickening agent is preferred.

(pH Adjusting Agents)

The pH of the pretreatment liquid is typically from 6 to 10, preferably from 6 to 9, more preferably from 6.5 to 8.5, and most preferably from 7 to 8.2. By setting the pH to such a range, the stability during storage of the pretreatment liquid becomes better, the rate of change in viscosity is minor, precipitation of the multivalent metal salt and the thickening agent can be suppressed, an aggregation effect of the multivalent metal salt is enhanced, and damage such as corrosion to members (particularly, metallic members) used in the printing device on which the pretreatment liquid is mounted tends to be suppressed. The pH of the pretreatment liquid can be measured by a known method, for example, a desktop type pH meter F-72 manufactured by Horiba, Ltd., using a standard TouPH electrode or a sleeve TouPH electrode.

Further, it is preferable to adjust a difference in pH between the pretreatment liquid and the aqueous color ink to be 0 to 2. By adjusting the difference in pH to such a range, an effect of the multivalent metal salt on the pretreatment liquid aggregating components in the aqueous color ink is enhanced.

Examples of the pH adjusting agent include organic amines; aqueous ammonium water; hydroxides of alkali metals, such as lithium hydroxide, sodium hydroxide, and potassium hydroxide; carbonates of alkali metals, such as lithium carbonate, sodium carbonate, sodium bicarbonate, and potassium carbonate; inorganic acids such as hydrochloric acid, sulfuric acid, phosphoric acid, and boric acid; organic acids such as acetic acid, citric acid, maleic acid, maleic anhydride, succinic acid, tartaric acid, malic acid, fumaric acid, malonic acid, ascorbic acid, and glutamic acid; and the like, and organic amines are preferred. As the organic amines, an organic amine selected from secondary amines and tertiary amines is preferred from the viewpoint of stability during storage. In particular, an organic amine having a hydroxy group is preferred, a secondary or tertiary alkylamine having at least one hydroxy group as a substituent for an alkyl group is more preferred, a C1 to C4 alkylamine having at least one hydroxy group is more preferred, and a C2 alkylamine having at least one hydroxy group is the most preferred. Further, the number of carbon atoms of the alkyl group having a hydroxy group is preferably two or more, more preferably C2 to C4, and most preferably C2. Examples thereof include dimethylethanolamine, diethanolamine, triethanolamine, N-methyldiethanolamine, etc.

The boiling point of the pH adjusting agent is preferably 100° C. or more from the viewpoint of preventing drying, sticking, and the like on the device to which the pretreatment liquid is applied. In addition, from the viewpoint of preventing deterioration of the drying property of the pretreatment liquid when printed at high speed, the boiling point of the pH adjusting agent is preferably 400° C. or less.

The molecular weight of the pH adjusting agent is typically from 75 to 500, preferably from 75 to 400, more preferably from 75 to 300, and most preferably from 75 to 235, as a mass-average molecular weight. By setting the molecular weight to such a range, it is possible to make it less likely for unevenness in the application of the pretreatment liquid to occur when printing is performed at a high speed. Note that when the pH adjusting agent is a single substance rather than a mixture, the above "mass-average molecular weight" shall be simply read as "molecular weight".

The content of the pH adjusting agent is typically about 0.01 to 5%, and preferably 0.05 to 3%, with respect to the total mass of the pretreatment liquid.

(Surfactants)

The pretreatment liquid according to the present embodiment preferably contains a surfactant, in order to adjust surface tension and improve wettability with respect to a recording medium. Examples of the surfactant include acetylene-based surfactants, silicone-based surfactants, acrylic surfactants, and fluorine-based surfactants. Among these, a surfactant selected from the acetylene-based surfactants and the silicone-based surfactants is preferred, and the acetylene-based surfactants are more preferred. When the pretreatment liquid contains such a surfactant, unevenness when the pretreatment liquid is applied to the recording medium can be prevented.

Examples of the surfactant include acetylene-based surfactants including Surfynol series such as Surfynol 61, 104E, 104H, 104A, 104BC, 104DPM, 104PA, 104PG-50, 420, 440, 465, 485, SE, and SE-F, Dynol 604 and 607 (manufactured by Air Products Co., Ltd.), Olfine series such as Olfine E1004, E1010 and E1020, PD-001, PD-002W, PD-004, PD-005, EXP. 4001, EXP. 4200, EXP. 4123, and EXP. 4300 (manufactured by Nissin Chemical Industry Co., Ltd.); and silicone-based surfactants such as BY16-201, FZ-77, FZ-2104, FZ-2110, FZ-2162, F-2123, L-7001, L-7002, SF8427, SF8428, SH3749, SH8400, 8032 ADDITIVE, and SH3773M (manufactured by Toray Dow Corning Co., Ltd.), Tegoglide 410, Tegoglide 432, Tegoglide 435, Tegoglide 440, Tegoglide 450, Tegotwin 4000, Tegotwin 4100, Tegowet 250, Tegowet 260, Tegowet 270, and Tegowet 280 (manufactured by Evonik Degussa GmbH), SAG-002 and SAG-503A (manufactured by Nissin Chemical Industry Co., Ltd.), BYK-331, BYK-333, BYK-345, BYK-346, BYK-347, BYK-348, BYK-349, BYKUV 3500, and BYK-UV 3510 (manufactured by BYK Chemie GmbH), KF-351A, KF-352A, KF-353, KF-354L, KF355A, KF-615A, KF-640, KF-642, and KF-643 (manufactured by Shin-Etsu Chemical Industry Co., Ltd.); and the like.

The content of the surfactant is typically about 0.01 to 5%, preferably about 0.05 to 3%, with respect to the total mass of the pretreatment liquid. However, it is preferable to determine the content of the surfactant in consideration of the surface tension of the aqueous color ink. In other words, when a printed matter is obtained by applying an aqueous color ink to a portion of a recording medium to which the pretreatment liquid has been applied, it is preferable that the surface tension of the pretreatment liquid is equal to or higher than that of the aqueous color ink from the viewpoint of preventing bleeding of the printed matter. By setting the surface tension to such a range, the aqueous color ink is sufficiently wetted and spreads, and bleeding of the printed matter can be prevented.

(Organic Solvents)

The pretreatment liquid according to the present embodiment preferably contains an organic solvent. By containing an organic solvent, it is possible to enhance uniformity when the pretreatment liquid is applied to a recording medium and drying property of the recording medium after the application. Further, since the pretreatment liquid contains an organic solvent, scratch resistance is improved and bleeding of a printed matter is less likely to occur.

Examples of the organic solvent include alcohols, glycol ethers, nitrogen-containing compounds, saccharides, amines, and the like, and glycol ethers are preferred. Note that, although some of saccharides or the like are present in a solid state, even such solid compounds may be used in the same manner as organic solvents by dissolving the solid compounds in water. For this reason, in this specification, such solid compounds are also classified as "organic solvents".

Examples of the glycol ethers include alkylene glycol mono ethers, alkylene glycol diethers, etc.

Examples of the alkylene glycol monoethers include alkylene glycol monoalkyl ethers, such as ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol monohexyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monobutyl ether, propylene glycol monopropyl ether, dipropylene glycol monomethyl ether, dipropylene glycol monoethyl ether, dipropylene glycol monopropyl ether, dipropylene glycol monobutyl ether, and tripropylene glycol monobutyl ether. Among these alkylene glycol monoethers, mono, di, tri, or tetra C2 to C4 alkylene glycol mono C1 to C6 alkyl ethers are preferred, and mono, di, tri, or tetra C2 to C3 alkylene glycol mono C1 to C4 alkyl ethers are more preferred.

Examples of alkylene glycol diethers include alkylene glycol dialkyl ethers, such as ethylene glycol dimethyl ether, ethylene glycol diethyl ether, ethylene glycol dibutyl ether, diethylene glycol dimethyl ether, diethylene glycol diethyl ether, diethylene glycol ethyl methyl ether, diethylene glycol dibutyl ether, diethylene glycol butyl methyl ether, triethylene glycol dimethyl ether, triethylene glycol diethyl ether, triethylene glycol dibutyl ether, triethylene glycol butyl methyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, and dipropylene glycol diethyl ether. Among these, mono, di, tri, or tetra C2 to C4 alkylene glycol di C1 to C6 alkyl ethers are preferred, and mono, di, tri, or tetra C2 to C3 alkylene glycol di C1 to C4 alkyl ethers are more preferred.

From the viewpoint of drying property, uniformity in application, compatibility with other components, and the like, dialkylene glycol monoalkyl ether is preferable as the organic solvent, di C2 to C3 alkylene glycol mono C1 to C3 alkyl ether is more preferable, and dipropylene glycol monomethyl ether is the most preferable.

The content of the organic solvent is typically about 1% to 10% and preferably about 3% to 8%, with respect to the total mass of the pretreatment liquid. By containing an organic solvent within the above range, uniformity when the pretreatment liquid is applied to a recording medium and drying property of the recording medium after the application tends to be good.

(Humectants)

As a humectant, one which does not remain is preferable when the pretreatment liquid is dried, and examples thereof include those having a boiling point of 100 to 350° C., preferably 150 to 300° C., and most preferably about 180 to 300° C., such as glycerin, ethylene glycol, diethylene glycol, propylene glycol, dipropylene glycol, 1,3-propanediol, 1,4-butanediol, hexylene glycol, and 2,3-butanediol. Of these humectants, glycerin is preferred.

The content of the humectant is typically about 1 to 30% and preferably about 10% to 30%, with respect to the total mass of the pretreatment liquid. By containing the humectant in the above range, the drying property of the printed matter tends to be good.

The pretreatment liquid according to the present embodiment may contain one type out of all the components mentioned above, or may contain two or more types.

[Method, etc. for Preparing Pretreatment Liquid]

The pretreatment liquid according to the present embodiment can be prepared according to known methods. For example, the pretreatment liquid can be prepared by adding a multivalent metal salt, a cationized guar gum, water, and the additive described above, if necessary, and stirring and mixing (heating, if necessary, for example, to about 40 to 60° C.). The pretreatment liquid obtained may be filtered, if required, to remove contaminants.

The viscosity of the pretreatment liquid at 20° C. is typically 2 to 300 mPa·s. By setting the viscosity to such a range, it is possible to apply the pretreatment liquid by various application methods described below. The viscosity of the pretreatment liquid can be measured using an E-type viscometer (TVE25L type viscometer manufactured by Toki Sangyo Co., Ltd.), a B-type viscometer (TVB10 type viscometer manufactured by Toki Sangyo Co., Ltd.), or the like. Since these viscometers have different measurable ranges of viscosities, it is preferable to properly use them depending on the viscosity to be measured.

The surface tension of the pretreatment liquid at 25° C. is typically 20 to 75 mN/m, preferably 21 to 65 mN/m, more preferably 22 to 55 mN/m, and most preferably 23 to 45 mN/m. The surface tension of the pretreatment liquid can be measured, for example, by a platinum-plate method using a surface tension meter (CBVPZ manufactured by Kyowa Interface Science Co., Ltd.) at 25° C.

<Aqueous Color Ink>

By pretreating a recording medium using the pretreatment liquid according to the present embodiment, a high-quality image, in which bleeding does not occur when an aqueous color ink is applied to the recording medium which has been pretreated, can be obtained.

The aqueous color ink according to the present embodiment contains a colorant and water. Below, the respective components contained in the aqueous color ink according to the present embodiment are described.

[Colorants]

Colorants are not particularly limited, and a colorant selected from water-soluble colorants and water-insoluble colorants can be used. In addition, these may be used in combination if necessary. Herein, "water-insoluble" means that solubility of a colorant in water at 25° C. is typically less than or equal to 3 g/L, preferably less than or equal to 2 g/L, and more preferably less than or equal to 1 g/L.

Water-insoluble colorants include, for example, pigments, disperse dyes, and solvent dyes. Typical examples of these colorants include colorants selected from C.I. Pigment, C.I. Disperse, and C.I. Solvent, respectively.

Water-soluble colorants include, for example, direct dyes, acid dyes, food dyes, basic dyes, reactive dyes, vat dyes, and soluble vat dyes. Typical examples of these colorants include dyes selected from C.I. Direct, C.I. Acid, C.I. Food, C.I. Basic, C.I. Reactive, C.I. Vat, and C.I. Solubilised Vat, respectively.

Note that a resin which contains a colorant which is contained in a transparent and water-insoluble resin can also be used as an insoluble colorant. Of these insoluble colorants, water-insoluble colorants are preferred and pigments are more preferred.

Examples of the pigment include inorganic pigments, organic pigments, and extender pigments.

Examples of the inorganic pigments include carbon black, metal oxides, metal hydroxides, metal sulfides, metal ferrocyanides, metal chlorides, etc. Examples of the carbon black include thermal black, acetylene black, oil furnace black, gas furnace black, lamp black, gas black, and channel black. Among these, furnace black, lamp black, acetylene black, channel black, and the like are preferred. Various types of carbon black are readily available from Columbia Carbon, Cabot Corporation, Degussa AG, Mitsubishi Chemical Corporation, and the like.

Examples of the organic pigments include soluble azo pigments, insoluble azo pigments, insoluble diazo pigments, condensed azo pigments, phthalocyanine pigments, quinacridone pigments, isoindolinone pigments, dioxazine pigments, perylene pigments, perinone pigments, thioindigo pigments, anthraquinone pigments, quinophthalone pigments, etc.

Examples of the organic pigments include, C.I. Pigment Yellow 1, 2, 3, 12, 13, 14, 16, 17, 24, 55, 73, 74, 75, 83, 93, 94, 95, 97, 98, 108, 114, 128, 129, 138, 139, 150, 151, 154, 180, 185, 193, 199, and 202; C.I. Pigment Red 5, 7, 12, 48, 48:1, 57, 88, 112, 122, 123, 146, 149, 166, 168, 177, 178, 179, 184, 185, 202, 206, 207, 254, 255, 257, 260, 264, and 272; C.I. Pigment Blue 1, 2, 3, 15, 15:1, 15:2, 15:3, 15:4, 15:6, 16, 22, 25, 60, 66, and 80; C.I. Pigment Violet 19, 23, 29, 37, 38, and 50; C.I. Pigment Orange 13, 16, 68, 69, 71, and 73; C.I. Pigment Green 7, 36, and 54; C.I. Pigment Black 1; etc.

Examples of the extender pigments include silica, calcium carbonate, talc, clay, barium sulfate, white carbon, etc. These extender pigments are not used alone. Extender pigments are typically used in combination with an inorganic pigment or an organic pigment for the purpose of improving powder fluidity.

Further, it is also possible to use self-dispersing pigments which are obtained by subjecting pigment particles to chemical treatment to impart self-dispersibility to the surface thereof.

Examples of the disperse dyes include C.I. Disperse Yellow 9, 23, 33, 42, 49, 54, 58, 60, 64, 66, 71, 76, 79, 83, 86, 90, 93, 99, 114, 116, 119, 122, 126, 149, 160, 163, 165, 180, 183, 186, 198, 200, 211, 224, 226, 227, 231, and 237; C.I. Disperse Red 60, 73, 88, 91, 92, 111, 127, 131, 143, 145, 146, 152, 153, 154, 167, 179, 191, 192, 206, 221, 258, and 283; C.I. Disperse Orange 9, 25, 29, 30, 31, 32, 37, 38, 42, 44, 45, 53, 54, 55, 56, 61, 71, 73, 76, 80, 96, and 97; C.I. Disperse Violet 25, 27, 28, 54, 57, 60, 73, 77, 79, and 79:1; C.I. Disperse Blue 27, 56, 60, 79:1, 87, 143, 165, 165:1, 165:2, 181, 185, 197, 202, 225, 257, 266, 267, 281, 341, 353, 354, 358, 364, 365, and 368; etc.

When the aqueous color ink according to the present embodiment contains a water-insoluble colorant, it is preferable that the aqueous color ink further contains a dispersant. Examples of the dispersant include copolymers composed of at least two monomers (preferably at least one of which is a hydrophilic monomer) selected from the group consisting of styrene and derivatives thereof; vinylnaphthalene and derivatives thereof; aliphatic alcohol esters of α,β-ethylenically unsaturated carboxylic acids; acrylic acid and derivatives thereof; maleic acid and derivatives thereof; itaconic acid and derivatives thereof; fumaric acid and derivatives thereof; vinyl acetate, vinyl alcohol, vinylpyrrolidone, acrylamide and derivatives thereof; etc. Examples of the type of the copolymers include a block copolymer, a random copolymer, a graft copolymer, etc.

Dispersants can be synthesized or obtained as a commercial product. Examples of commercially available products include styrene-acrylic resins such as Joncryl 62, 67, 68, 678, and 687, all of which are manufactured by Johson Polymer Limited; Mowinyl S-100A (modified vinyl acetate resin manufactured by Nichigo-Movinyl Co., Ltd.); Julimer AT-210 (polyacrylic ester copolymer manufactured by Nihon Junyaku Co., Ltd.); and the like. When synthesizing a dispersant, dispersants disclosed in WO 2013/115071 are preferably mentioned.

A dispersant can be used as a mixture with a colorant. It is also possible to coat the surface of a colorant with a dispersant and use as a so-called micro-encapsulated pigment. Both of these dispersants may also be used in combination.

[Water]

As water contained in the aqueous color ink according to the present embodiment, water containing few impurities such as metal ions is preferred. Examples of such water include ion-exchanged water and distilled water.

[Ink Preparation Agent]

The aqueous color ink according to the present embodiment may further contain an ink preparation agent in addition to the colorant and water. Examples of the ink preparation agent include a binder, a water-soluble organic solvent, a water-soluble polymer compound, a surfactant, a preservative, an antifungal agent, a pH adjusting agent, a chelating reagent, a rust inhibitor, a water-soluble ultraviolet ray absorber, an antioxidant, a defoaming agent, and the like.

Note that, as the additive to the pretreatment liquid according to the present embodiment and as the ink preparation agent for the aqueous color ink according to the present embodiment, the same compound may be classified differently. Further, different compounds may be described as belonging to the same classification. In such cases, the pretreatment liquid and the color ink shall separately and independently follow the description as the compound or classification regarding the pretreatment liquid and the color ink, respectively.

(Binders)

As the binders, one or more types selected from polymers and waxes are used. However, a dispersant of the pigment is not classified as the binder.

Examples of the polymers include a urethane type, a polyester type, an acrylic type, a vinyl acetate type, a vinyl chloride type, an acrylic styrene-acrylic type, an acrylic-silicone type, and a styrene-butadiene type polymers or emulsions containing the same. The polymers can be either synthesized or obtained as commercial products. When synthesizing a polymer, a polymer disclosed in, for example, WO 2015/147192 or the like is preferred.

Examples of commercially available products of the polymers include Superflex 126, 130, 150, 170, 210, 420, 470, 820, 830, and 890 (urethane type resin emulsion manufactured by DKS Co., Ltd.); Hydran HW-350, HW-178, HW-163, HW-171, AP-20, AP-30, WLS-201, and WLS-210 (urethane type resin emulsion manufactured by DIC Corporation); 0569, 0850Z, 2108 (styrene-butadiene type resin emulsion manufactured by JSR Corporation); AE980, AE981A, AE982, AE986B, and AE104 (acrylic resin emulsion manufactured by E-TEC Co., Ltd.); and the like.

As the wax, a wax emulsion is preferred and an aqueous wax emulsion is more preferred. As the wax, natural waxes and synthetic waxes can be used.

Examples of the natural waxes include emulsions in which waxes including petroleum-based waxes such as paraffin wax and microcrystalline wax; brown coal-based waxes such as montan wax; plant-based waxes such as carnava wax and candelier wax; animal-and-plant-based waxes such as beeswax and lanolin are dispersed in an aqueous medium.

Examples of the synthetic wax include polyalkylene waxes (preferably poly C2 to C4 alkylene waxes), oxidized polyalkylene waxes (preferably oxidized poly C2 to C4 alkylene waxes), paraffin wax, etc.

Examples of commercially available products of wax emulsions include CERAFLOUR 925, 929, 950, and 991; AQUACER 498, 515, 526, 531, 537, 539, 552, and 1547; AQUAMAT 208, 263, and 272; MINERPOL 221, and the like, which are manufactured by BYK-Chemie GmbH; Mitsui High Wax NL100, NL200, NL500, 4202E, 1105A, 2203A, NP550, NP055, and NP505 manufactured by Mitsui Chemicals, Inc.; KUE-100 and 11, which are manufactured by Sanyo Chemical Industry Co., Ltd., and the like.

(Water-Soluble Organic Solvents)

Examples of the water-soluble organic solvents include C1 to C6 alkanols having one hydroxy group such as methanol, ethanol, propanol, isopropanol, butanol, isobutanol, secondary butanol, and tertiary butanol; amides such as N,N-dimethylformamide and N,N-dimethyl acetamide; lactams such as 2-pyrrolidone, N-methyl-2-pyrrolidone, and N-methylpyrrolidin-2-one; cyclic ureas such as 1,3-dimethylimidazolidin-2-one and 1,3-dimethylhexahydropylimid-2-one; ketones or ketoalcohols, such as acetone, 2-methyl-2-hydroxypentan-4-one, and ethylene carbonate; cyclic ethers such as tetrahydrofuran and dioxane; mono-, oligo-, or poly-alkylene glycols or thioglycols having a C2 to C8 alkylene unit(s), such as ethylene glycol, diethylene glycol, 1,2-propylene glycol, 1,3-propylene glycol, 1,4-butylene glycol, 1,6-hexylene glycol, 1,2-hexanediol, 1,2-pentanediol, 4-methyl-1,2-pentanediol, 3,3-dimethyl-1,2-butanediol, 1,2-octanediol, 5-methyl-1,2-hexanediol, 4-methyl-1,2-hexanediol, 4,4-dimethyl-1,2-pentanediol, diethylene glycol, triethylene glycol, tetraethylene glycol, dipropylene glycol and polyethylene glycol or polypropylene glycol, thiodiglycol or dithiodiglycol, etc. which have a molecular weight of 400 or more; polyols (triols) such as glycerin, diglycerin, hexane-1,2,6-triol, trimethylolpropane; y-butyrolactone; dimethyl sulfoxide; and the like.

(Water-Soluble Polymer Compounds)

Examples of the water-soluble polymer compounds include anionic or nonionic polymer compounds. Examples of the anionic polymer compounds include cellulose derivatives such as carboxy methylcellulose; acrylic acid derivatives such as polyacrylic acid; polystyrene derivatives such as polystyrene sulfonate salts; and the like. Examples of the nonionic polymer compounds include polyethylene glycol, polyvinyl alcohol, polyvinyl pyrrolidone, gelatin, etc.

(Surfactants)

Examples of the surfactant include anionic, cationic, nonionic, amphoteric, silicone-based, and fluorine-based surfactants.

Examples of the anionic surfactants include alkylsulfocarboxylate salts, α-olefinsulfonate salts, polyoxyethylene alkyl ether acetate salts, polyoxyethylene alkyl ether sulfate salts, N-acylamino acids or salts thereof, N-acylmethyltaurine salts, alkylsulfate salt polyoxyalkylether sulfate salts, alkyl sulfate salt polyoxyethyelene alkyl ether phosphate salts, rosin acid soap, castor oil sulfate ester salts, lauryl alcohol sulfate ester salts, alkyl phenol type phosphate esters, alkyl type phosphate esters, alkylarylsulfonate salts, diethyl sulfosuccinate salts, diethylhexyl sulfosuccinate salts, dioctylsulfosuccinate salts, and the like.

Examples of the cationic surfactants include 2-vinylpyridine derivatives and poly4-vinylpyridine derivatives.

Examples of the nonionic surfactants include ether-based nonionic surfactants such as polyoxyethylene nonylphenyl ether, polyoxyethylene octylphenyl ether, polyoxyethylene dodecylphenyl ether, polyoxyethylene oleyl ether, polyoxyethylene lauryl ether, polyoxyethylene alkyl ether, polyoxyethylene distyrenated phenyl ether (e.g., Emulgen A-60, A-90, and A-500 manufactured by Kao Corporation); esters such as polyoxyethylene oleate, polyoxyethylene distearate, sorbitan laurate, sorbitan monostearate, sorbitan monooleate, sorbitan sesquioleate, polyoxyethylene monooleate, and polyoxyethylene stearate; acetylene glycols (alcohols) such as 2,4,7,9-tetramethyl-5-decyne-4,7-diol, 3,6-dimethyl-4-octyne-3,6-diol, and 3,5-dimethyl-1-hexyn-3-ol; polyglycol ethers, and the like. Examples of commercially available products of these ether-based nonionic surfactants include Surfynol 104, 104PG50, 82, 420, 440, 465, and 485 and Olfine STG of Nissin Chemical Industry Co., Ltd.; and Emulgen A-60, A-90, and A-500 manufactured by Kao Corporation, and the like.

Examples of the amphoteric surfactants include lauryl dimethylaminoacetic acid betaine, 2-alkyl-N-carboxymethyl-N-hydroxyethylimidazolinium betaine, coconut oil fatty acid amide propyl dimethylaminoacetic acid betaine, polyoctyl polyaminoethylglycine, imidazoline derivatives, and the like.

Examples of the silicone-based surfactants include polyether-modified siloxanes, polyether-modified polydimethylsiloxanes, and the like. Examples thereof include Dynol 960 and 980 from Air Products Co., Ltd.; Silface SAG001, SAG002, SAG003, SAG005, SAG503A, SAG008, SAG009, and SAG010 manufactured by Nissin Chemical Industry Co., Ltd.; BYK-345 347, 348, 349, and 3455 and LP-X23288, LP-X23289, and LP-X23347 manufactured by BYK-Chemie GmbH; TEGO Twin 4000, TEGO Wet KL 245 250, 260, 265, 270, and 280 manufactured by Evonic Tego Chemie GmbH; and the like.

Examples of the fluorine-based surfactants include perfluoroalkyl sulfonic acid compounds, perfluoroalkyl carboxylic acid-based compounds, perfluoroalkyl phosphate compounds, perfluoroalkyl ethylene oxide adducts, polyoxyalkylene ether polymer compounds each having a perfluoroalkyl ether group on its side chain, and the like.

(Preservatives)

Examples of the preservatives include organosulfur-based, organonitrogen sulfur-based, organohalogen-based, haloarylsulfone-based, iodopropagyl-based, haloalkylthio-based, nitrile-based, pyridine-based, 8-oxyquinoline-based, benzothiazole-based, isothiazoline-based, dithiol-based, pyridine oxide-based, nitropropane-based, organotin-based, phenol-based, quaternary ammonium salt-based, triazine-based, thiazine-based, anilide-based, adamantane-based, dithiocarbamate-based, brominated indanone-based, benzyl bromoacetate-based, inorganic salt-based compounds, and the like. Examples of commercially available products of the preservatives include Proxel GXL (S) and XL-2 (S) manufactured by Arch Chemicals Inc., and the like.

(Antifungal Agents)

Examples of the antifungal agents include sodium dehydroacetate, sodium benzoate, sodium pyridinethione-1-oxide, ethyl p-hydroxybenzoate, 1,2-benzisothiazolin-3-one, and salts thereof.

(pH Adjusting Agents)

As a pH adjusting agent, any material can be used as long as a pH of an ink to be prepared can be adjusted from 5 to 11 without adversely affecting the ink. Examples thereof include alkanolamines such as diethanolamine, triethanolamine, and N-methyldiethanolamine; hydroxides of alkali metals such as lithium hydroxide, sodium hydroxide, and potassium hydroxide; ammonium hydroxide (aqueous ammonia water); carbonates of alkali metals such as lithium carbonate, sodium carbonate, sodium hydrogen carbonate, and potassium carbonate; alkali metal salts of organic acids such as sodium silicate and potassium acetate; inorganic bases such as disodium phosphate; and the like.

(Chelating Reagents)

Examples of the chelating reagents include disodium ethylenediamine tetraacetate, sodium nitrilotriacetate, sodium hydroxyethylethylenediamine triacetate, sodium diethylenetriamine pentaacetate, sodium uracil diacetate, and the like.

(Rust Inhibitors)

Examples of the rust inhibitors include acidic sulfites, sodium thiosulfate, ammonium thioglycolate, diisopropylammonium nitrite, pentaerythritol tetranitrate, dicyclohexylammonium nitrite, and the like.

(Water-Soluble Ultraviolet Ray Absorbers)

Examples of the water-soluble ultraviolet ray absorbers include sulfonated benzophenone-based compounds, benzotriazole-based compounds, salicylic acid-based compounds, cinnamic acid-based compounds, triazine-based compounds, and the like.

(Antioxidants)

As an antioxidant, a variety of organic anti-fading agents and metal complex-based anti-fading agents can be used. Examples of the organic anti-fading agents include hydroquinones, alkoxyphenols, dialkoxyphenols, phenols, anilines, amines, indanes, chromans, alkoxyanilines, heterocyclics, and the like.

(Defoaming Agents)

Examples of the defoaming agents include silicone-based, silica mineral oil-based, olefine-based, acetylene-based defoaming agents, and the like. Examples of commercially available defoaming agents include Surfynol DF37, DF58, DF110D, DF220, and MD-20, Olfine SK-14, all of which are manufactured by Shin-Etsu Chemical Industry Co., Ltd.

The aqueous color ink according to the present embodiment may contain one type or two or more types with respect to all of the components mentioned above.

[Method for Preparing Aqueous Color Ink, Etc.]

The aqueous color ink according to the present embodiment can be prepared by adding a colorant, water, and an ink preparation agent if needed, followed by stirring and mixing.

When the aqueous color ink is used as an inkjet ink, it is preferable to use a material having a small content of inorganic impurities such as chlorides (e.g., sodium chloride) and sulfates (e.g., sodium sulfate) of metallic cations in the ink. A measure of the content of the inorganic impurities is about 1% or less with respect to the total mass of the colorant, and the lower limit may be less than or equal to the detection limit of the analytical instrument, that is, 0%.

Inorganic impurities are often present in the colorant. Therefore, inorganic impurities can be removed, if necessary. Examples of purification methods include a method of suspending solids of the colorant in a mixed solvent of water and a C1 to C4 alcohol such as methanol and purifying the solids; and a method of exchanging and adsorbing inorganic impurities using an ion-exchange resin after preparing the aqueous color ink.

The aqueous color ink can be used in various types of recording and printing. For example, the aqueous color ink is suitable for writing instruments, various printing, information recording, textile printing, and the like, and is preferably used for inkjet printing.

<Image Forming Method>

The image forming method according to the present embodiment includes a step of applying the pretreatment liquid mentioned above to a recording medium, and a step of applying the aqueous color ink mentioned above to a portion of the recording medium, with the portion being provided with the pretreatment liquid.

Examples of methods for applying the pretreatment liquid to a recording medium include an inkjet method, a blade coating method, a gravure coating method, an offset gravure coating method, a bar coating method, a roll coating method, a knife coating method, an air knife coating method, a comma coating method, a U comma coating method, an AKKU coating method, a smoothing coating method, a micro-gravure coating method, a reverse roll coating method, a 4 to 5 roll coating method, a dip coating method, a curtain coating method, a slide coating method, a die coating method, and the like.

These known methods can be classified into two types: a method of printing on a recording medium in a non-contact manner as in inkjet printing, and a method of printing by bringing a pretreatment liquid into contact with a recording medium. Of these, when the method of printing in the non-contact manner is employed, it is preferable to apply the pretreatment liquid only to a portion to which an aqueous color ink is to be applied thereafter, from the viewpoint of saving the texture of the recording medium as much as possible. In addition, when the printing method of bringing a pretreatment liquid into contact with a recording medium is employed, it is preferable to coat the recording medium with a roller method, from the viewpoint of simplicity of the device, uniform coating, good working efficiency, excellent economic efficiency, and the like. The roller method refers to a printing method in which a pretreatment liquid is given to a rotating roller beforehand and then the pretreatment liquid is transferred from the roller to a recording medium. Examples of coating machines for the roller method include an offset gravure coater, a gravure coater, a doctor coater, a bar coater, a blade coater, a flexo coater, a roll coater, and the like.

With respect to a thickness of a layer of the pretreatment liquid when applying the pretreatment liquid to a recording medium, it is difficult to unconditionally determine the thickness, since the thickness varies depending on the amount of the aqueous color ink to be applied. As a measure, the thickness is typically 0.2 to 10 μm, preferably 0.3 to 8.5 μm, and more preferably 0.4 to 7 μm in a wet state. With such a thickness, it is possible to prevent an original texture of the recording medium from being damaged.

It is preferable that the pretreatment liquid applied to the recording medium be dried by heating before the aqueous color ink is adhered to. By drying the pretreatment liquid and then applying the aqueous color ink, it is possible to prevent the recording medium from producing a finish such that the recording medium is not flat but undulating, or to prevent generation of image defects such as bleeding of the recorded image.

The method of drying the recording medium is not particular limited and a known drying method can be employed. Examples include a heating drying method, a hot air-drying method, an infrared ray drying method, a microwave drying method, a drum drying method, and the like. By using these drying methods in combination, for example, using a heating drying method and a hot air-drying method in combination, it is possible to dry the pretreatment liquid in a shorter period of time than when each of the drying methods is performed alone. For this reason, it is also preferable to use drying methods in combination.

As the method of applying an aqueous color ink to a recording medium after applying the pretreatment liquid, the inkjet method is preferred. Examples of the inkjet method include a charge control method, a drop-on-demand (pressure pulse) method, an acoustic inkjet method, a thermal inkjet method, and the like. Further, examples include a method of improving image quality by injecting a large number of ink droplets, each in a small volume, of an aqueous color ink containing a small content of colorant; a method of improving image quality using a plurality of inks having substantially the same hue but different concentrations of colorant in the inks; a method of improving the fixability of a colorant by using a colorless transparent ink; and the like.

When the aqueous color ink is used for inkjet printing, recording can be performed by loading a container containing an aqueous color ink at a predetermined position of an inkjet printer and discharging droplets of the aqueous color ink in response to a recording signal so that the droplets adhere to the recording medium. Ink nozzles and the like of the inkjet printer are not particularly limited, and can be appropriately selected according to the purpose.

The recording medium described above is not particularly limited as long as the pretreatment liquid and the aqueous color ink can be applied on the recording medium. Examples of the recording media include paper, film, fiber and cloth (cellulose, nylon, wool, and the like), leather, and a substrate for a color filter.

The recording media can be roughly divided into those having an ink receiving layer and those having no ink receiving layer.

Recording media having an ink receiving layer are typically called inkjet exclusive paper, inkjet exclusive film, glossy paper, or the like. Examples of representative commercially available products thereof include Professional Photo Paper, Super Photo Paper, Glossy Gold, and Matte Photopaper manufactured by Canon Inc.; photographic paper CRISPIA (Super Glossy), Photo Paper (Glossy), and Photo Matte Paper manufactured by Seiko-Epson Corporation; Advanced Photo Paper (Glossy) manufactured by Hewlett Packard Japan, Ltd.; Kassai Shashin-Shiage Puro ("colored picturesque photo finish for professional use") manufactured by FUJIFILM Corporation; and the like. By applying the pretreatment liquid to these recording media, improvement in water resistance and high color development can be expected.

Examples of the recording medium having no ink receiving layer include various types of papers such as coated paper and art paper used in applications such as gravure printing and offset printing; cast coated paper used in label printing applications; and the like. When a recording medium having no ink receiving layer is used, it is also preferable to perform a surface modification treatment on the recording medium to improve the fixability and the like of colorant.

As the surface modification treatment, at least one treatment selected from a corona discharge treatment, a plasma treatment, and a frame treatment is preferably performed. It should be noted that since the effect of these treatments is known to be attenuated over time, it is preferable to perform inkjet recording immediately after a surface modification treatment has been performed on the recording medium. The surface modification treatment can be performed by appropriately adjusting the number of repeated treatments, the treatment time, the applied voltage, and the like so as to obtain the desired effects.

With respect to all of the above-described matters, a combination of preferred ones is more preferable, and a combination of more preferred ones is even more preferable. The same applies to a combination of a preferred one and a more preferred one, and a combination of a more preferred one and the most preferred one, and the like.

EXAMPLES

Below, the present invention is more specifically described by way of the Examples, but the present invention is not limited to the following Examples. Water used in the Examples is ion-exchanged water, unless otherwise specified. Further, unless otherwise specified, an operation such as a reaction is performed under stirring, and a reaction temperature is a measured value of an internal temperature of a reaction system. The pigment content in a dispersion liquid was measured by a dry-weight method using MS-70 manufactured by A & D Co., Ltd., and was obtained in terms of the pigment content from the total solid content in the liquid.

Example 1

To water (41.6 parts) warmed to 60° C., Catinal CG-100S (cationized guar gum manufactured by Toho Chemical Industry Co., Ltd.) (0.1 parts) was added and stirred for 60 minutes to obtain a liquid. To the liquid obtained, magnesium sulfate heptahydrate (manufactured by FUJIFILM Wako Pure Chemical Corporation) (26.6 parts) was added, and the mixture was further stirred for 30 minutes to obtain a liquid. To the liquid obtained, TEA80 (0.08 parts), glycerin (manufactured by Tokyo Chemical Industry Co., Ltd.) (25.0 parts), dipropylene glycol monomethyl ether (manufactured by Tokyo Chemical Industry Co., Ltd.) (6.5 parts), Olfine E1010 (manufactured by Nissin Chemical Industry Co., Ltd.) (0.075 parts), and Proxel GXL (S) (manufactured by Arch Chemicals Inc.) (0.05 parts) were sequentially added, and the mixture was further stirred for one hour to obtain a liquid. The resulting liquid was heated to 60° C., and stirred for an additional one hour to obtain a pretreatment liquid.

Examples 2 to 6

Pretreatment liquids of Examples 2 to 6 were obtained in the same manner as in Example 1, except that the respective components described in Table 1 below were used.

TABLE 1

| Components | Examples | | | | | |
|---|---|---|---|---|---|---|
| | 1 | 2 | 3 | 4 | 5 | 6 |
| CG-100S | 0.1 | 0.1 | 0.1 | 0.1 | 0.1 | 0.1 |
| MgSO$_4$ | 26.6 | — | — | — | — | — |
| MgCl$_2$ | — | 27.7 | — | — | — | — |
| CaCl$_2$ | — | — | 17.2 | — | — | — |
| Ca(NO$_3$)$_2$ | — | — | — | 18.7 | — | — |
| BaCl$_2$ | — | — | — | — | 15.3 | — |
| SrCl$_2$ | — | — | — | — | — | 13 |
| Glycerin | 25 | 25 | 25 | 25 | 25 | 25 |
| TEA80 | 0.08 | 0.08 | 0.08 | 0.08 | 0.08 | 0.08 |
| MDP | 6.5 | 6.5 | 6.5 | 6.5 | 6.5 | 6.5 |
| E1010 | 0.08 | 0.08 | 0.08 | 0.08 | 0.08 | 0.08 |
| GXL (S) | 0.05 | 0.05 | 0.05 | 0.05 | 0.05 | 0.05 |
| Water | Balance | | | | | |
| Total | 100 | 100 | 100 | 100 | 100 | 100 |

Comparative Examples 1 to 5

Pretreatment liquids of Comparative Examples 1 to 5 were obtained in the same manner as in Example 1, except that the respective components described in Table 2 below were used. Note that in the pretreatment liquids of Comparative Examples 1 and 2, precipitation of solid components was observed, and a uniform liquid could not be obtained. Therefore, with respect to the pretreatment liquids of Comparative Examples 1 and 2, a bleeding test and a stability during storage test described below were not performed.

TABLE 2

| Components | Comparative Examples | | | | |
|---|---|---|---|---|---|
| | 1 | 2 | 3 | 4 | 5 |
| AH-15F | 0.5 | — | — | — | — |
| AW-15F | — | 0.1 | — | — | — |
| SC-230M | — | — | 0.1 | — | — |
| Leogard GP | — | — | — | 0.7 | — |
| Leogard MGP | — | — | — | — | 0.2 |
| MgSO$_4$ | 26.6 | 26.6 | 26.6 | 26.6 | 26.6 |
| Glycerin | 25 | 25 | 25 | 25 | 25 |
| TEA80 | 0.08 | 0.08 | 0.08 | 0.08 | 0.08 |
| MDP | 6.5 | 6.5 | 6.5 | 6.5 | 6.5 |

TABLE 2-continued

|  | Comparative Examples | | | | |
| --- | --- | --- | --- | --- | --- |
| Components | 1 | 2 | 3 | 4 | 5 |
| E1010 | 0.08 | 0.08 | 0.08 | 0.08 | 0.08 |
| GXL (S) | 0.05 | 0.05 | 0.05 | 0.05 | 0.05 |
| Water | Balance | | | | |
| Total | 100 | 100 | 100 | 100 | 100 |

Incidentally, abbreviations and the like described in Tables 1 to 2 have the following meanings.
  CG-100S: Catinal CG100-S (cationized guar gum manufactured by Toho Chemical Industry Co., Ltd.)
  $MgSO_4$: magnesium sulfate heptahydrate
  $MgCl_2$: magnesium chloride hexahydrate
  $CaCl_2$: calcium chloride dihydrate
  $Ca(NO_3)_2$: calcium nitrate tetrahydrate
  $BaCl_2$: barium chloride dihydrate
  $SrCl_2$: strontium chloride
  AH-15F: hydroxyethyl cellulose (manufactured by Sumitomo Seika Co., Ltd.)
  AW-15F: hydroxyethyl cellulose (manufactured by Sumitomo Seika Co., Ltd.)
  SC-230M: CELQUAT SC-230M (cationized hydroxyethyl cellulose manufactured by Akzo Nobel N.V.)
  Leogard GP: cationized hydroxyethyl cellulose (manufactured by Lion Corporation)
  Leogard MGP: cationized hydroxyethyl cellulose (manufactured by Lion Corporation)
  TEA80: triethanolamine
  MDP: dipropylene glycol monomethyl ether (manufactured by Tokyo Chemical Industry Co., Ltd.)
  E1010: Olfine E1010 (acetylene-based surfactant manufactured by Nissin Chemical Industry Co., Ltd.)
  GXL(S): Proxel GXL(S) (manufactured by Arch Chemicals Inc.)

Preparation Example 1: Preparation of Magenta Dispersion Liquid

A block copolymer described in Synthesis Example 3 of WO 2013/115071 was prepared, and the block copolymer obtained (6 parts) was dissolved in methyl ethyl ketone (20 parts) to obtain a uniform solution. To this solution, a solution obtained by dissolving sodium hydroxide (0.45 parts) in water (53.55 parts) was added, and then C.I. Pigment Red 122 (Inkjet Magenta E02 manufactured by Clariant) (20 parts) was added, and a dispersion treatment was performed in a sand grinder under conditions of 1,500 rpm for 15 hours to obtain a liquid. Water (100 parts) was added dropwise to the liquid obtained, and then the liquid was filtered to obtain a filtrate. From the filtrate obtained, methyl ethyl ketone and a part of water were distilled off under a reduced pressure using an evaporator to obtain a magenta dispersion liquid having a pigment content of 11.8%.

Preparation Example 2: Preparation of Cyan Dispersion Liquid

A block copolymer described in Synthesis Example 3 of WO 2013/115071 was prepared, and the block copolymer obtained (6 parts) was dissolved in methyl ethyl ketone (20 parts) to obtain a uniform solution. To this solution, a solution obtained by dissolving sodium hydroxide (0.45 parts) in water (53.55 parts) was added, and then C.I. Pigment Blue 15:4 (Chromofine blue 4851 manufactured by Dainichiseika Color & Chemicals Mfg. Co., Ltd.) (20 parts) was added, and a dispersion treatment was performed in a sand grinder under conditions of 1500 rpm for 15 hours to obtain a liquid. Water (100 parts) was added dropwise to the liquid obtained, and then the liquid was filtered to obtain a filtrate. From the filtrate obtained, methyl ethyl ketone and a part of water were distilled off under reduced pressure using an evaporator to obtain cyan dispersion liquid having a pigment content of 11.8%.

Preparation Example 3: Preparation of Aqueous Color Inks 1 and 2 for Evaluation Test Each of the components described in Table 3 below was mixed to obtain a total amount of 100 parts of a liquid, and then the liquid obtained was filtered through a membrane filter having a pore diameter of 3 μm to obtain aqueous color inks 1 and 2 to be used in the evaluation test.

TABLE 3

|  | Aqueous color ink | |
| --- | --- | --- |
| Components | 1 | 2 |
| Magenta dispersion liquid | 42.4 | — |
| Cyan dispersion liquid | — | 42.3 |
| Glycerin | 20 | 20 |
| DEG | 5 | 5 |
| 1,2-HD | 10.5 | 10.5 |
| GXL (S) | 0.1 | 0.1 |
| SF465 | 0.3 | 0.3 |
| Water | Balance | |
| Total | 100 | 100 |

Abbreviations and the like in Table 3 have the following meanings.
  DEG: diethylene glycol
  1,2-HD: 1,2-hexanediol
  GXL(S): Proxel GXL(S) (manufactured by Arch Chemicals Inc.)
  SF465: Surfynol 465 (nonionic surfactant manufactured by Nissin Chemical Industry Co., Ltd.)

Using the respective pretreatment liquids of Examples 1 to 6 and Comparative Liquids 3 to 5 obtained as described above and color inks 1 and 2, bleeding properties of the recorded images and stability during storage of the pretreatment liquids were evaluated based on the following methods.

[Bleeding Test]

Using a printing tester, Flexiproof 100 (manufactured by Matsuo Sangyo Co., Ltd.), the respective pretreatment liquids of the Examples and the Comparative Examples were applied to a sheet of OK top coat+(product name for paper manufactured by Oji Paper Co., Ltd.) as a recording medium. The application of the pretreatment liquids was carried out using an anilox roller having a linear number of 140 lines/inch as a roller.

Then, cartridges of an inkjet printer PX-205 manufactured by Seiko Epson Co., Ltd. were filled with aqueous color inks 1 and 2 and the aqueous color inks were adhered by inkjet printing to the surface of the recording medium to which the respective pretreatment liquids had been applied. Inkjet printing was performed such that each of aqueous color inks 1 and 2 was adjacent to each other and that each ink formed a solid image of 100% duty. With respect to images obtained by inkjet printing, a portion at which aqueous color ink 1 and 2 are adjacent to each other was visually observed, and the degree of bleeding at the boundary portion of the colors was evaluated based on the following evaluation criteria. The evaluation results are indicated in Table 4 below.

—Evaluation Criteria—
- A: an image in which no bleeding was observed and the color border was sharp was obtained.
- B: an image in which slight bleeding was observed but the color border could be recognized was obtained.
- C: an image in which considerable bleeding was observed and the color border was not clear was obtained.
- D: an image in which bleeding was severe and almost no color border could be recognized was obtained.

[Stability During Storage Test]

The pretreatment liquids of the Examples and the Comparative Examples were prepared and immediately stored at 60° C. for one week, and then viscosities thereof were measured. The viscosities were measured using an E-type viscometer "ELD type viscometer" (manufactured by Toki Sangyo Co., Ltd.) at 20° C. and a rotation speed of 1 to 20 rpm. In addition, the rate of change in viscosity was calculated by using the following formula and rounding off to the first decimal place.

Rate of change (%)={(value before storage-value after storage)/value before storage}×100

The evaluation results are indicated in Table 4 below.

TABLE 4

| Evaluation results | Examples | | | | | | Comparative Examples | | |
|---|---|---|---|---|---|---|---|---|---|
| | 1 | 2 | 3 | 4 | 5 | 6 | 3 | 4 | 5 |
| Bleeding | A | A | A | A | A | A | A | A | A |
| Viscosity (Before storage) | 33 | 25 | 16 | 12 | 10 | 13 | 47 | 286 | 108 |
| Viscosity (After storage) | 31 | 24 | 14 | 11 | 9.6 | 12 | 36 | 60 | 78 |

TABLE 4-continued

| Evaluation results | Examples | | | | | | Comparative Examples | | |
|---|---|---|---|---|---|---|---|---|---|
| | 1 | 2 | 3 | 4 | 5 | 6 | 3 | 4 | 5 |
| Viscosity change rate (%) | 6 | 4 | 13 | 8 | 4 | 8 | 23 | 79 | 28 |

From Table 4, the pretreatment liquids of Examples 1 to 6 were superior in stability during storage compared with the pretreatment liquids of Comparative Examples 3 to 5. Further, as a result of inkjet printing of the respective aqueous color inks on recording media to which the respective pretreatment liquids obtained had been applied, clear images without bleeding were obtained in all of the Examples and the Comparative Examples. Thus, it could be observed that all the pretreatment liquids sufficiently satisfied performance as a pretreatment liquid.

The invention claimed is:

1. A pretreatment liquid, comprising a multivalent metal salt, a cationized guar gum, water, and dipropylene glycol monomethyl ether,
   wherein the pretreatment liquid is applied to a recording medium before an aqueous color ink comprising a colorant is applied to the recording medium, and
   wherein molecular weight and concentration of the cationized guar gum are selected to achieve a viscosity at 20° C. of 10 to 300 mPa·s.

2. The pretreatment liquid according to claim 1, wherein the multivalent metal salt is a salt of a multivalent metal selected from the group consisting of calcium, magnesium, barium, and strontium.

3. An image forming method comprising:
   applying the pretreatment liquid according to claim 1 to a recording medium; and
   applying an aqueous color ink comprising a colorant to a portion of the recording medium, wherein the portion is provided with the pretreatment liquid.

* * * * *